(No Model.)

R. M. HUNTER.
ELECTRIC HEATING APPARATUS FOR ELECTRIC RAILWAYS.

No. 417,920. Patented Dec. 24, 1889.

Attest
E. McDermott.
E. M. Breckinridge

Inventor
R. M. Hunter

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC HEATING APPARATUS FOR ELECTRIC RAILWAYS.

SPECIFICATION forming part of Letters Patent No. 417,920, dated December 24, 1889.

Application filed May 9, 1887. Serial No. 237,535. (No model.)

*To all whom it may concern:*

Be it known that I, RUDOLPH M. HUNTER, of the city and county of Philadelphia, and State of Pennsylvania, have invented an Improvement in Heating Apparatus for Railways, of which the following is a specification.

My invention has reference to electric heating apparatus for electric railways; and it consists in certain improvements, all of which are fully set forth in the following specification, and shown in the accompanying drawings, which form part thereof.

The object of my invention is to provide means to heat and light a car which is preferably propelled by an electric motor. The current, when taken from line-conductors extending along the railway, is collected by current-collectors preferably extending above the car, and making a traveling connection with the line-conductors, which, in such case, would be suspended. The collectors may be of any construction found desirable. These collectors supply electricity to the motor on the car, and, if desired, to a secondary battery thereon, which may be employed for supplying current to suitable lighting or heating apparatus on the car, or to propel the car over a portion of the track where suspended conductors are impracticable, in which case the collectors would be disconnected. These secondary batteries are preferably located under the seats of the cars, and inclosed in compartments having hinged doors on either the outside or inside of the car, or both.

My invention also comprehends minor details, which are fully set forth hereinafter.

Figure 1:
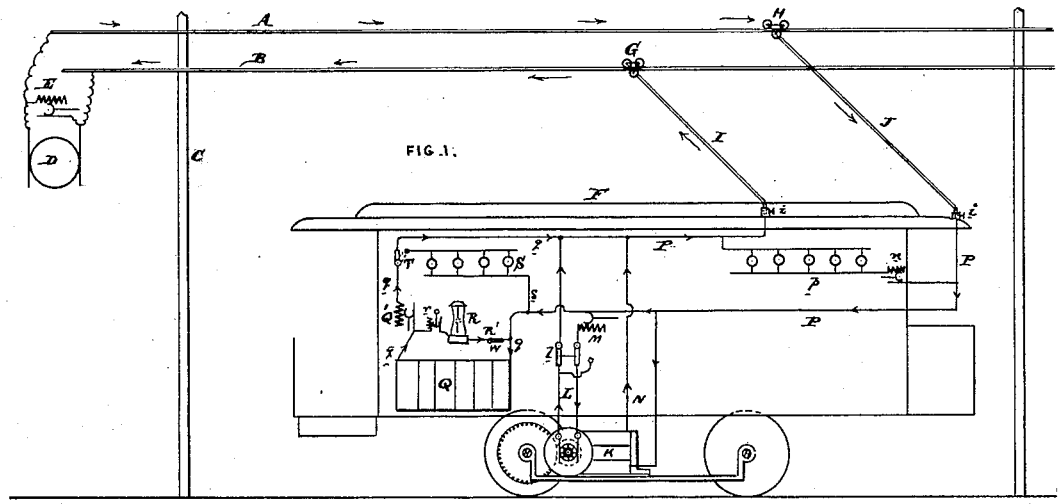
Figure 2:
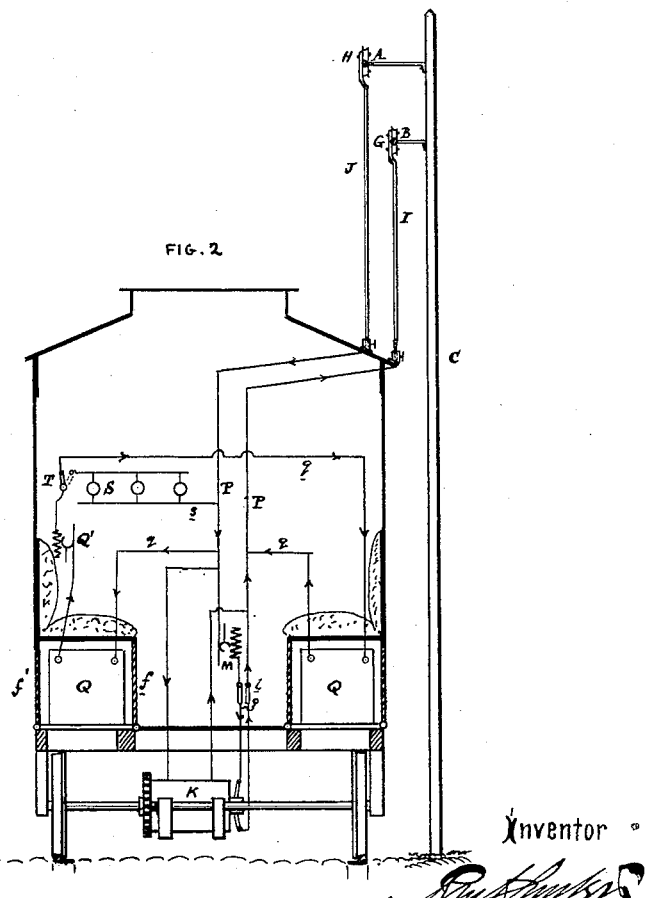

In the drawings, Figure 1 is a side elevation of an electric railway and car embodying my improvements, and Fig. 2 is a sectional elevation of same.

A and B are the two suspended bared conductors, and are supported upon posts C, arranged at intervals apart and connecting with the generator D, which may be provided with a regulator E to control the amount of current passing to line. The conductors A and B may be arranged one above the other, as shown in Figs. 1 and 2, or may be arranged in the same horizontal plane.

F is the car, and is propelled by an electric motor K, constructed in any suitable manner and mechanically connected with the axle.

G and H are two independent collectors adapted to run in connection with the conductors B and A, respectively, and are entirely separate and distinct, each being free to follow irregularities in its own conductor. These collectors may be made in any suitable manner to produce good contact with little friction. The collectors G and H are connected to conductors I and J, (preferably flexible,) which respectively connect with the car through detachable connections $i$, whereby they may be readily detached when the car is to continue farther along its route, and where there are no suspended conductors. The conductors I and J supply current to the motor-circuit P on the car, from which circuit the current passes to the motor K over circuit L, provided with a current-reverser $l$ and a resistance-changer M.

Q are secondary batteries, which are located under the seats of the car, being entirely inclosed therein by doors $f$ $f'$ upon the inside and outside of the car, either or both of which doors may be employed. These batteries consist of a number of cells connected, preferably, in series, and are charged from the motor-circuit or conductors I and J by a circuit $q$, provided with a resistance-changer Q' to control the amount of current passing through the battery while being charged.

T is a switch, which may be employed to cut the battery out of circuit from the line-conductors, or said switch T may be employed to connect the secondary battery in circuit with the electric lamps S in circuit $s$, the resistance-changer Q' being then employed to regulate the current flowing through the lamps. If desired, the secondary battery may also be utilized to supply electric current to the electric heater R, arranged in a circuit R' and provided with a resistance-changer $r$. This heater may also receive its current direct from the collectors, and its circuit R' may have a circuit-breaker W to cut the heater out of circuit.

$p$ represents an electric-light circuit arranged as a shunt around the motor, and is provided with a resistance-changer $r$ to control the amount of current flowing through the lamps. The secondary batteries would not require removal often; but when necessary their removal may be made through the doors $f$ or $f'$. If desired, primary batteries may be used in place of secondary batteries. If desired, the rails may be used as the return-conductors, in which case only one suspended conductor would be used. When the electrically-propelled vehicle passes from the portion of the line supplied with the overhead conductors to a portion of the line not supplied with any conductors, then the collector-conductors I J are disconnected at $i$, and the secondary battery Q is employed as a source of electric power to operate the motor over such portion of the line as is not supplied with the suspended conductors.

I do not limit myself to the details here shown, as they may be modified in various ways without departing from my invention.

Any matters set out in this application but not claimed are not dedicated to the public, but form subject-matter of my application, Case 113, Serial No. 325,957, filed October 4, 1889.

Having now described my invention, what I claim as new, and desire to secure by Letters Patent, is—

1. The combination of a suspended conductor, an electrically-propelled vehicle, a current-collector extending from the vehicle to the suspended conductor, a secondary battery on said vehicle, an electric heater or stove to heat said vehicle, and a circuit including said battery and stove and receiving current from the current-collector.

2. The combination of a suspended conductor, an electrically-propelled vehicle, a current-collector extending from the vehicle to the suspended conductor, a secondary battery on said vehicle, an electric heater or stove to heat said vehicle, a circuit including said battery and stove and receiving current from the collector, and a switch to cut said heater or stove out of circuit without interfering with the battery-connections.

3. The combination of a suspended conductor, an electrically-propelled vehicle, a current-collector extending from the vehicle to the suspended conductor, an electric heater or stove to heat said vehicle, a circuit including said stove and receiving current from the collector, and means to control the current flowing through the heater or stove.

4. The combination of an electrically-propelled vehicle having a motor mechanically connected with the axle, a battery carried upon or moving with said vehicle, an electric circuit on the vehicle for supplying current from said battery to the motor, an electric heater to heat the vehicle, and an electric circuit between the battery and heater, whereby the heater is in multiple connection with the motor with respect to the battery.

5. The combination of an electrically-propelled vehicle having a motor mechanically connected with the axle, a battery carried upon or moving with said vehicle, an electric circuit on the vehicle for supplying current from said battery to the motor, an electric heater to heat the vehicle, an electric circuit between the battery and heater, whereby the heater is in multiple connection with the motor with respect to the battery, and independent means for controlling the current flowing through the motor and through the heater.

6. The combination of an electrically-propelled vehicle having a motor mechanically connected with the axle, a battery carried upon or moving with said vehicle, an electric circuit on the vehicle for supplying current from said battery to the motor, an electric heater to heat the vehicle, an electric circuit between the battery and heater, whereby the heater is in multiple connection with the motor with respect to the battery, a current-reversing switch for the electric motor, and a circuit-breaking switch for the electric heater.

7. The combination of an electrically-propelled vehicle having an electric motor connected with the axle, an electric battery for supplying current moving with or carried thereby, an electric heater to heat the vehicle, electric lamps to light the vehicle, and circuits for coupling the electric-motor heater and lamps in multiple connection with each other and with respect to the battery.

8. The combination of an electrically-propelled vehicle having an electric motor connected with the axle, an electric battery for supplying current moving with or carried thereby, an electric heater to heat the vehicle, electric lamps to light the vehicle, circuits for coupling the electric motor, heater, and lamps in multiple connection with each other and with respect to the battery, and an independent current-controlling device for said motor, heater, and lighting circuits.

9. The combination of an electrically-propelled vehicle having an electric motor connected with the axle, an electric battery for supplying current moving with or carried thereby, an electric heater to heat the vehicle, electric lamps to light the vehicle, circuits for coupling the electric motor, heater, and lamps in multiple connection with each other and with respect to the battery, and independent hand-operated switches for cutting motor, lamps, and heater out of circuit independently of each other.

10. The combination of an electrically-propelled vehicle having an electric motor connected with the axle, an electric battery for supplying current moving with or carried thereby, an electric heater to heat the vehicle, electric lamps to light the vehicle, circuits for coupling the electric motor, heater, and lamps in multiple connection with each other and with respect to the motor and battery, independent switches for cutting the lamps and heater out of circuit independently of each other, and current-regulating devices to control the relative amount of current passing through the heating and lighting circuits.

11. An electrically-propelled vehicle having an electric motor connected to the axle, a battery composed of series of cells connected in series for supplying electricity to the motor, an electric heater for heating the vehicle, and a heating-circuit, including the heater and said cells of the battery and coupled in parallel with the motor.

12. An electrically-propelled vehicle having an electric motor connected to the axle, a battery composed of series of cells connected in series for supplying electricity to the motor, an electric heater for heating the vehicle, heating-circuit including the heater and said cells of the battery and coupling the heater in parallel with the motor, and independent current-controlling devices for controlling the flow of the current through the heater and through the motor.

13. The combination of an electrically-propelled vehicle having compartments under its seats, electric batteries arranged in said compartments and protected thereby, an electric motor connected to the axle to propel the vehicle, arranged under the vehicle-body and supported by the axles independently of said body, an electric heater to heat the vehicle arranged within the vehicle-body and exterior to the compartments under the seats, electric circuits leading from the batteries within the compartments under the seats to the heater and motor, and means for cutting out the heater independently of the motor with respect to the battery.

14. The combination of an electrically-propelled vehicle having compartments under its seats, electric batteries arranged in said compartments and protected thereby, an electric motor connected to the axle to propel the vehicle arranged under the vehicle-body and supported by the axles independently of said body, an electric heater to heat the vehicle arranged within the vehicle-body and exterior to the compartments under the seats, electric circuits leading from the batteries within the compartments under the seats to the heater and motor and connecting the heater and motor in parallel with respect to the battery, and independent means for cutting out the heater and motor with respect to the battery.

In testimony of which invention I hereunto set my hand.

RUDOLPH M. HUNTER.

Witnesses:
   E. M. BRECKINREED,
   RICHD. S. CHILD, Jr.